United States Patent [19]

Restle et al.

[11] Patent Number: 5,315,807

[45] Date of Patent: May 31, 1994

[54] INTERMITTENT SEAL SENSING APPARATUS AND METHODS FOR POUCH WEBS

[75] Inventors: Randall C. Restle, Crestview Hills; Walter Munch, Fort Thomas, both of Ky.

[73] Assignee: R.A. Jones & Co. Inc., Covington, Ky.

[21] Appl. No.: 968,728

[22] Filed: Oct. 30, 1992

[51] Int. Cl.⁵ .................... B65B 57/02; B65B 61/06
[52] U.S. Cl. ........................... 53/51; 53/67; 53/455; 53/562; 493/9
[58] Field of Search ............ 53/51, 67, 69, 562, 53/455, 52; 493/9

[56] References Cited

U.S. PATENT DOCUMENTS

| | | | |
|---|---|---|---|
| 3,453,799 | 7/1969 | Cloud et al. | 53/51 X |
| 3,481,099 | 12/1969 | Clancy | 53/51 X |
| 3,680,446 | 8/1972 | James et al. | 53/51 X |
| 3,782,069 | 1/1974 | Fischbein et al. | 53/67 |
| 3,782,252 | 1/1974 | Kozlowski et al. | 493/9 |
| 3,802,051 | 4/1974 | Andler et al. | 53/67 X |

Primary Examiner—James F. Coan
Attorney, Agent, or Firm—Wood, Herron & Evans

[57] ABSTRACT

A vacuum means for detecting transverse seal areas dividing unsealed areas in adjacent plies of a moving, multiple ply web includes vacuum ports defining a gap through which the web moves. Unsealed web areas are sucked against the ports. When a sealed area enters the gap, it is sucked to one or the other port, uncovering the opposite port. The ensuing pressure differential is sensed to indicate a seal entering or passing the gap. Seal signals are produced and used to control accurate cutting at the seals to separate the web into individual pouches. Control and circuitry apparatus and methods are disclosed.

28 Claims, 5 Drawing Sheets

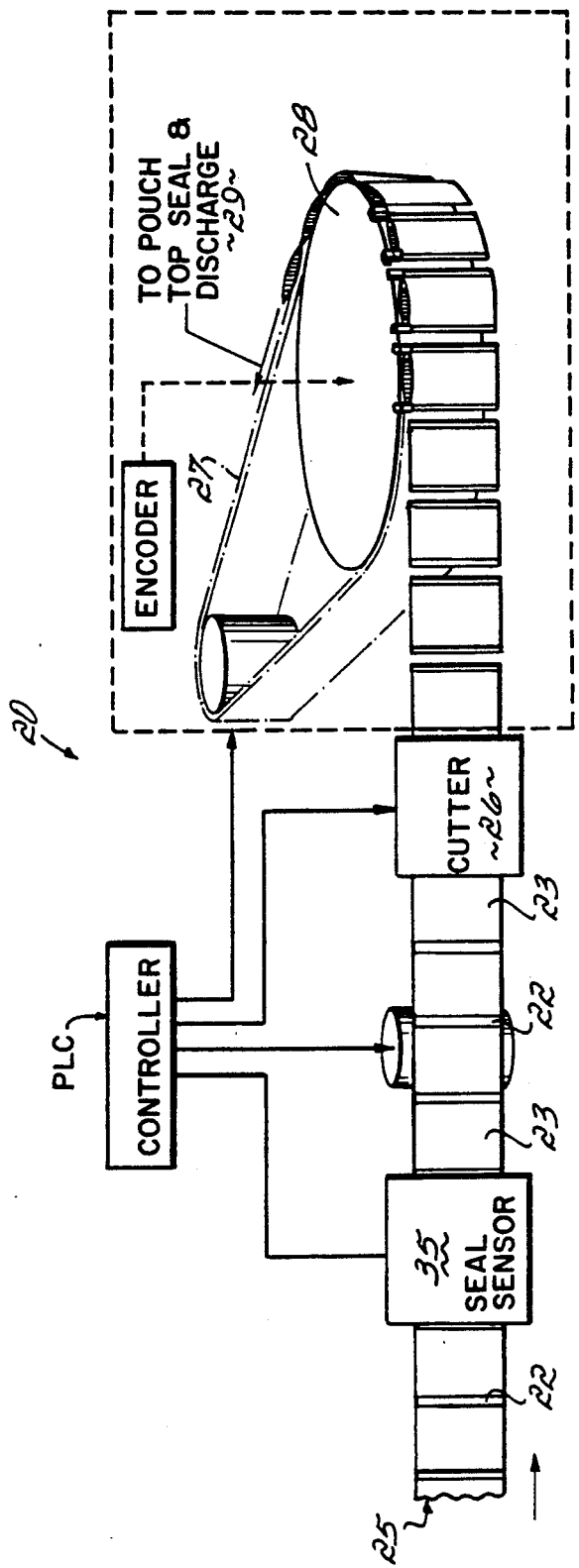
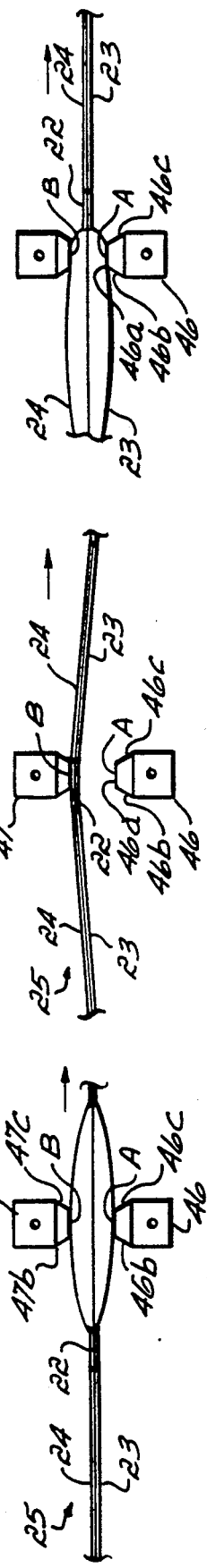

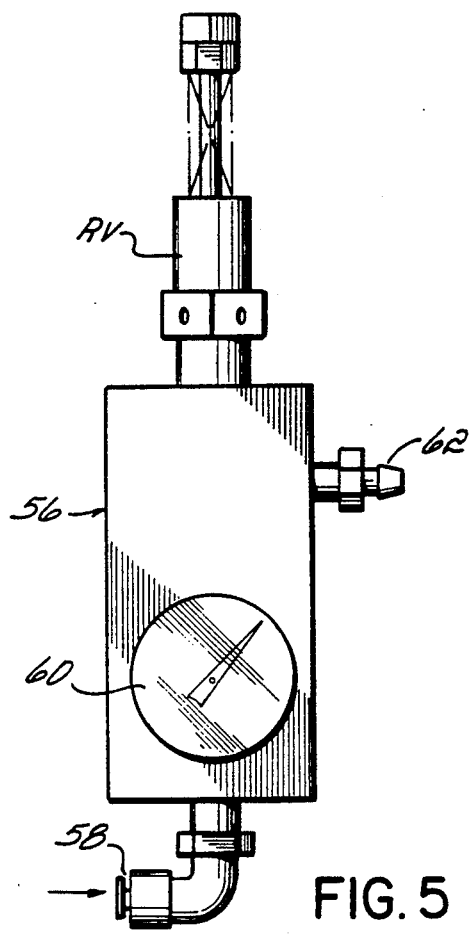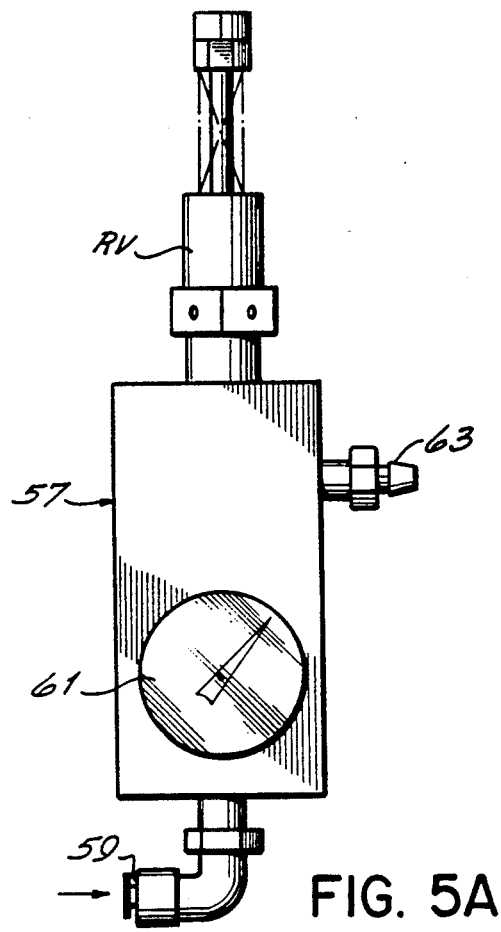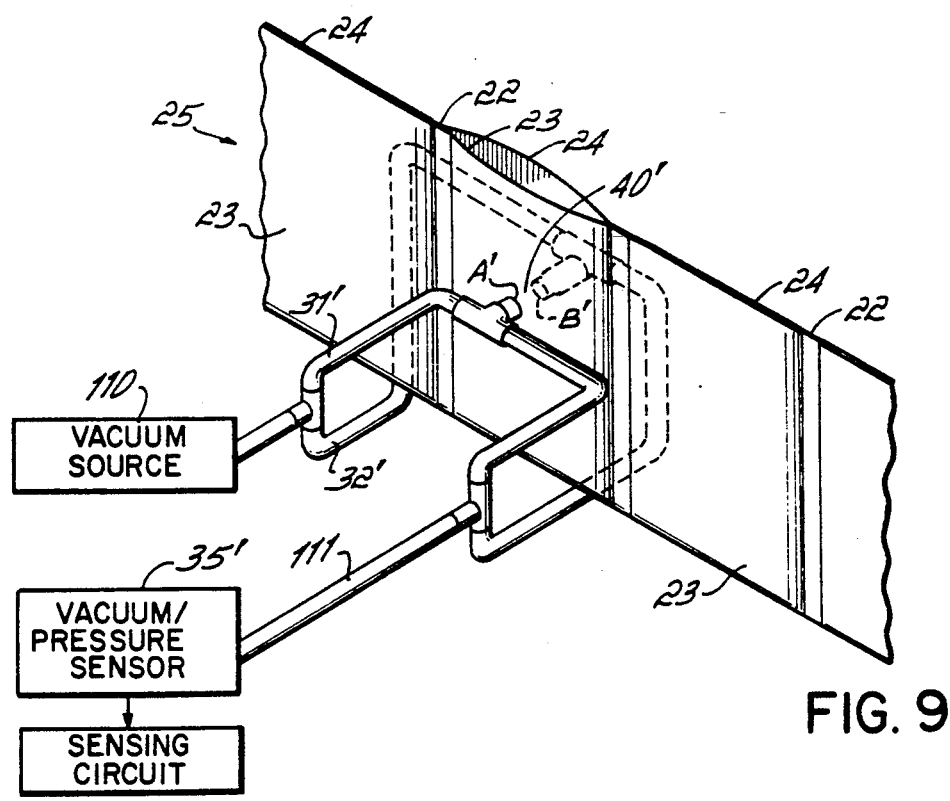

POWER SUPPLY

INTERMITTENT SEAL SENSING APPARATUS AND METHODS FOR POUCH WEBS

FIELD OF THE INVENTION

This invention relates to the manufacture of product filled pouches and more particularly to apparatus and methods for sensing seal areas between pouches in an interconnected train of pouches.

BACKGROUND

Flexible sealed pouches are currently used in many packaging applications. By way of example only, pouches are used to package individual servings of granular materials such as sugar, sweeteners, powders for beverages such as hot chocolate, liquid condiments such as mayonnaise, ketchup, mustard or the like, and other food stuffs or consumer goods.

In one form of pouch packaging, a web of pouch material is fed from a supply roll. The web is folded longitudinally and transverse seals are formed to provide a train of serially disposed pouches, open along a top edge and connected side-by-side by virtue of the seals. The pouches are separated from each other by cutting the train transversely along the seal locations, and are then transported about a filler wheel for filling and top end sealing.

It is desirable to separate or cut the pouches one from the other in a manner to provide uniform sized pouches. Stated in another way, it is desirable to form pouches having side seals of equal width relative to other pouches.

In order to fulfill this goal, it is desirable to cut the pouches in the center of the transverse seals with an equal width of the seal disposed on each side of the cut, and on each pouch side. It is thus necessary to provide a means by which the cutter or knife is operated in a manner so as to produce such cuts repeatably in the seal center for all pouch line speeds utilized.

One method of accomplishing this would be to mark or "register" the web to indicate the center of each seal, sense the mark or register, and drive the cutter in response to such sensing after any system delay.

Such methods have certain inherent disadvantages. For example, the register sensing method requires an indexed or registered web, and a means for sensing the web.

Accordingly, it has been one objective of the invention to provide improved apparatus and methods for sensing the location of transverse seals across a multiple ply or moving web.

It has been another objective of the invention to provide improved apparatus and methods for separating pouches from a train of interconnected pouches.

Another objective of the invention has been to provide improved methods and apparatus for detecting seal areas between pouches in an unregistered, non-indexed train of pouches.

Another objective of the invention has been to provide an improved seal sensing and control system for consistently establishing a cut within sensed transverse areas of a multiple ply web and within a fine tolerance range.

To these ends, a preferred embodiment of the invention comprises running a two-ply intermittently sealed web through a gap between two opposed ports, each connected to a vacuum. As the unsealed web portions are drawn across the ports, they are pulled apart and against the respective ports. This seals the ports to establish a non-zero or static pressure on the vacuum sides of the port. When the seal area moves through the gap, the vacuum at each port tries to pull the web toward the respective ports. Due to the seal, however, the material can be pulled only to one side or the other. When this pulling occurs, the sealed laminate remains stuck to one side or the other. The opposite port is opened, breaking the vacuum. This port opening causes a pressure change which is sensed to signal the introduction of the seal area to the gap between aligned, opposed vacuum ports. As the web continues, the seal passes the vacuum ports and the web material again is pulled out to cover each vacuum port. This reestablishes a threshold pressure in the system which event can be sensed to indicate seal passage. Seal position and width is thus sensed for the pouch line speed. These sensing signals are utilized to drive a controller for operating a downstream cutter on a delay sufficient to divide or separate the pouches down the middle of the seal area. Moreover, in order to maintain the cuts at the center of each seal area within desirable tolerances, a central loop is used for comparison and correction. This comprises an encoder driven from the master filler wheel axis or servo, with encoder counts divided by a predetermined pouch pitch or length setting (in the longitudinal web flow direction). This encode signal is compared in a programmable logic controller to the seal sensing signal frequency to establish an error and the system is operable to repeatedly collapse that error at a slew rate controller to avoid over correction. A slaved axis or servo for the web drive feeding the cutter is thus controlled as a function of web speed, predetermined pouch pitch, sensed seals and a comparatively generated error to maintain the seal position relative to the cutter within an acceptable tolerance range for the application.

It will be appreciated that the invention has many uses or applications for both intermittent and continuous motion machines, not only for pouches but in many applications where intermittent seals must be accurately sensed. No web register is required, nor are any change parts required due to varied web line speeds and web materials.

These and other advantages will become readily apparent from the following detailed description of a preferred and other embodiments of the invention and from the drawings in which:

FIG. 1 is a perspective view illustrating one form of a pouch forming and filling system using the invention;

FIGS. 2A through 2C illustrate operation of one vacuum seal sensor according to the invention;

FIG. 5 is a diagrammatic view of a fluid connector manifold of one embodiment of the invention;

FIG. 5A is a diagrammatic view of another fluid connector manifold of such one embodiment of the invention;

FIG. 9 is a perspective view illustrating another embodiment of the invention using a single or common vacuum source.

DETAILED SPECIFICATION

Figure 2:
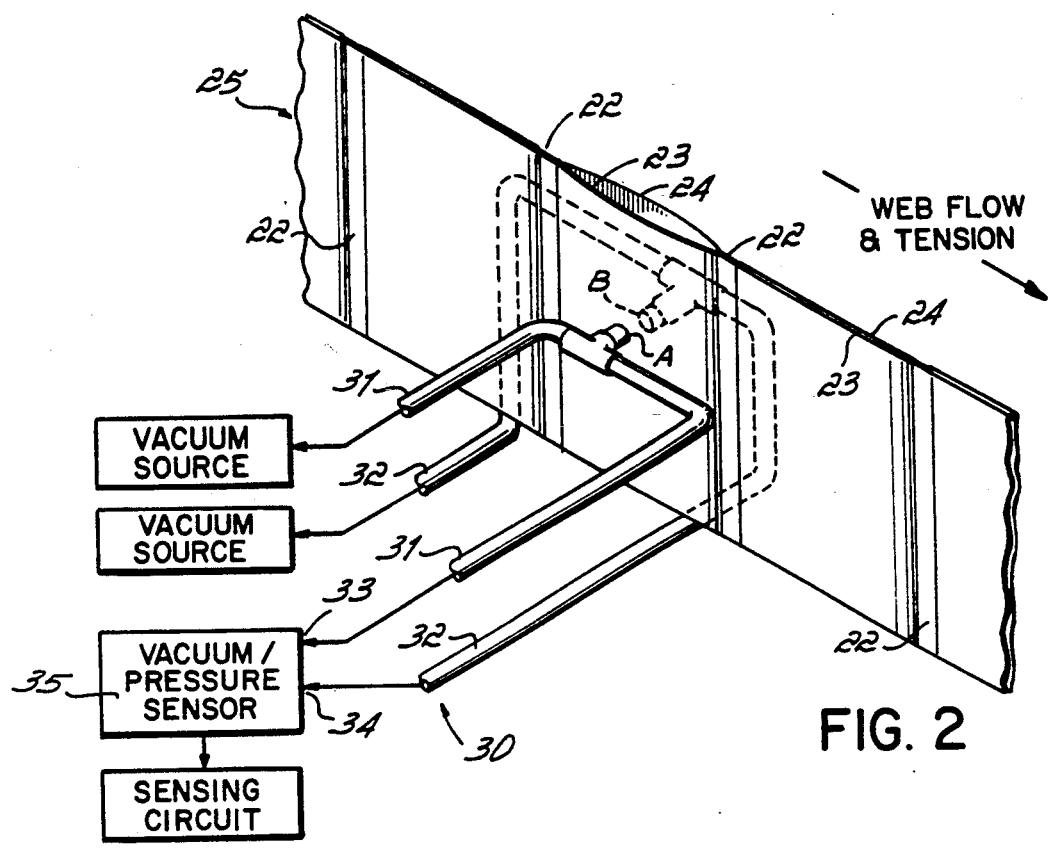
FIG. 2 is a diagrammatic view of a vacuum operated seal sensor in accordance with one embodiment of the invention using two independent vacuum sources.

Turning now to FIG. 1, there is shown an illustrative diagram of a portion of one form of pouch forming, filling and sealing apparatus with which the invention is used, although it can be used by others as well. The apparatus 20, or rather that portion of it as shown in FIG. 1, is useful to form a web into a plurality of individual filled and sealed pouches. In the apparatus 20, and upstream of that portion shown in FIG. 1, a web of pouch material is unrolled from a supply and is folded over on itself along a bottom fold line 21. Thereafter, transverse seals such as at 22 are formed in the two halves of the web, which comprise sidewalls 23 and 24. See, for example, FIGS. 2A through 2C. Accordingly, a folded and transversely sealed web 25 is formed in an intermediate part of the apparatus and is transported to that portion of the apparatus depicted at 20 in FIG. 1. The web 25 is directed through a station where a cutter 26 serves to cut transversely through the web, preferably along the center of the seal areas 22, so as to separate the unfilled and unsealed pouches from the seriatim train of pouches shown in the web 25.

Downstream of the cutter 26 pouches are picked up by gripper mechanisms, a plurality of which are carried on a chain 27 about a filler wheel 28. The grippers (not shown) serve to move the edges of the pouch inwardly to cause the sidewalls 23 and 24 at their unsealed upper edge to open. As the pouches are carried about the filler wheel 28, a funnel is utilized to drop product into the pouches. The pouches are then carried about the filler wheel 28 to a top seal station and then discharge station 29 where the pouches are transported from the grippers via an appropriate discharge mechanism. Of course, after the pouches are filled, the grippers move the edges of the pouch away from each other, so as to cause the pouch walls 23 and 24 to come back together. The upper edge of the pouch is then sealed to form a complete pouch prior to the discharge of the pouch at station 29. The details of the gripper mechanisms, filler wheel seal and discharge apparatus form no part of this invention, but are described for example in U.S. Pat. No. 4,956,964. This patent is herein expressly incorporated by reference.

As heretofore noted, it is desirable to produce uniform pouches. While the transverse seal areas 22 are formed in the web material on a generally uniform basis, it is desirable to control the cutter 26 to cut the pouches one from the other along a transverse cut line which extends along the transverse seal area 22, and to have these cut lines located as close as possible to the center of the seal areas. In order to accomplish this, it has been common in the past to pre-mark the seal area with a mark which is detectable by a mark sensor. The mark is sensed as the web moves past the sensor and a signal, indicative of the passage of the mark at that position, is fed to a controller which is interconnected to a cutter and possibly to the downstream filler wheel apparatus to control the cutter to slice the pouches apart within the seal area. In order to monitor this operation an encoder has been used, driven by the cutter, or the web flow motor or axis. That encoder signal is compared with the predetermined signal in a controller, so that errors between the two signals can be corrected. The particular seal sensor used in the prior art has included, for example, a photo eye for sensing the mark in the seal area. The present invention as shown in FIG. 1 differs from this structure in the nature of the seal sensor and in the nature of the use of the signals from the seal sensor to control the cutter 26.

As noted above, it is desirable to provide apparatus and methods for sensing the seal areas in a train of intermittently sealed packages or pouches, without the necessity of referring to a register mark on the web. This is accomplished, according to a preferred embodiment of the invention, by apparatus which is diagrammatically depicted for example in FIG. 2.

In FIG. 2, a vacuum seal sensing apparatus 30 includes a first vacuum line 31 and a second vacuum line 32. Each of these lines is connected to independent suction or vacuum sources. For example, two isolated sources could be used, as the same source used but regulated by check valves to isolate independent vacuum circuits in lines 31 and 32. Vacuum line 31 is provided with a vacuum port A, while vacuum line 32 is provided with a vacuum port B. The lines 31 and 32 continue on upstream from ports A and B, where they are attached to fittings 33 and 34 respectively, of a vacuum sensor 35.

Figure 6:
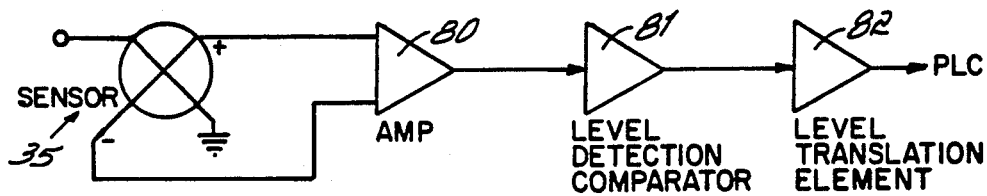
FIG. 6 is an illustrative flow chart illustrating the sensing circuits of the invention.
Figure 7:
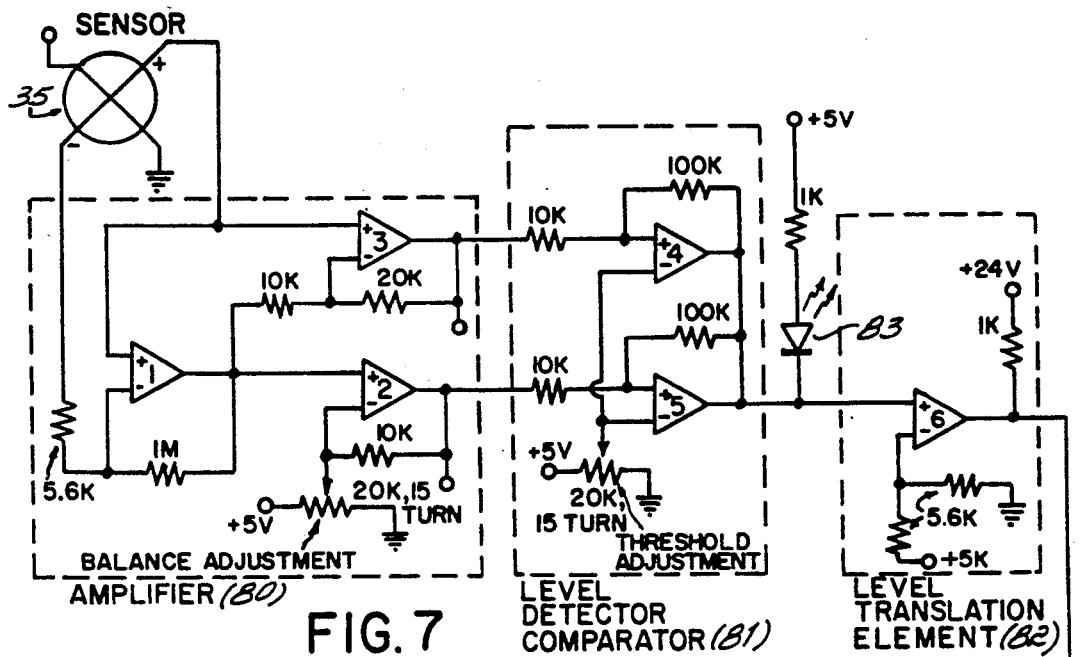
FIG. 7 is an electrical schematic diagram showing one form of sensing circuit for the invention.
Figure 7A:
FIG. 7A is an illustrative diagram of the pressure sensor of FIGS. 6 and 7.

Vacuum sensor 35 is diagrammatically illustrated in FIG. 7A and comprises a piezoresisitive sensor, model no. MPX205DP, purchased from the Motorola Company, providing an electronic bridge such as illustrated in FIG. 7. Such transducers are typically used in unrelated applications, such as in blood pressure monitoring and the like. Yet according to the invention, such transducers find useful applications in vacuum sensing processes for pouch manufacturing. Moreover, such sensors with this transducer typically have a negative pressure side and a positive pressure side to which is introduced negative and positive pressure, respectively. As will be appreciated, however, this invention contemplates circuitry for analyzing and using a signal generated by a pressure change in said sensor regardless of which side of the transducer is exposed to negative pressure and which side to positive pressure. Referring to FIG. 7A, the vacuum sensor 35 includes a piezoresistive pressure transducer 36, which is connected via a plurality of electronic leads 37 to an electronic circuit as illustrated in FIGS. 6 and 7. Within the vacuum sensor 35 are located two chambers 38 and 39, respectively disposed on each side of the piezoresistive transducer 36. As will be further discussed, when the pressures P1 and P2 in the respective chambers 38 and 39 are equal, the vacuum sensor 35 may be adjusted to a zero or null position. When the pressures in the chambers vary, there is a pressure differential across the transducer 36 and an electrical signal is thereby generated, as will be discussed in connection with the further description of the circuit shown in FIG. 7.

Returning now to FIG. 2, however, and with reference to FIGS. 2A through 2C, a brief description of the operation of the invention will be helpful in considering its further structural and operational features. In essence, the invention senses the seal areas 22 by detecting a change in the vacuum or pressure in the lines 31 and 32, which is applied to the web 25. It will be appreciated that ports A and B are disposed opposite to one another across a gap, such as gap 40 as shown in FIG. 2. When the vacuum or suction lines 31 and 32 are connected to independent sources of vacuum, a fluid flow is drawn through ports A and B. This suction pulls the respective sidewalls 23 and 24 of each pouch against the respective ports B and A. When the sidewalls of the pouch engage the ports, the walls stick to or seal off the ports and shut off any flow of air into the lines 31 and 32. This suction operation is shown, for example, in FIG. 2A where the ports A and B have sucked apart sidewalls 23 and 24 of a pouch.

Referring now to FIG. 2B, the web has moved to the right, as shown in FIG. 2B and as shown in FIG. 2. In this situation, the seal area 22 has been transported into the gap between ports A and B. Since the gap is wider than the thickness of the seal between the two sidewalls 23 and 24, the seal area cannot serve to shut off both ports A and B. While vacuum is drawn through both of these ports, the seal remains stuck to one or the other port, sealing it and opening the opposite port. As shown in FIG. 2B, the seal area 22 has sealed against port B and left port A open. Since port A is open, the line 31 upstream of port A and leading to the fitting 33 of the sensor 35, will see somewhat of a pressure increase since the line is ported or vented and relieved from the suction through the downstream suction or vacuum source.

Accordingly, and referring briefly to FIG. 7A, the pressure P1 in the chamber 38 will be increased, while the pressure P2 remains essentially the same. This causes the transducer 36 to register a pressure differential between the lines 31 and 32 and to generate a signal to the control circuit shown in FIG. 7. This signal is amplified and analyzed by the control circuit so that it can be taken as an indication of the passage of a seal area 22 past the gap 40. Accordingly, the passage of the seal area 22 past the gap 40 is sensed and indicated by means of the generation of a differential pressure existent in the lines 31 and 32, which are attached to the vacuum sensor 35. The seal areas in the web 25 are thus readily indicated without reference to any prescribed marking or registration matter on the web.

As shown in FIG. 2C, the constant motion of the web to the righthand side of the figure draws the following pouch into the gap 40. A continuing suction action through both the ports A and B served to draw the walls 23 and 24 of the following pouch out against the ports, thus equalizing the sensor, which is then ready for sensing of the following seal area.

It will be appreciated that the illustration in FIG. 2 is diagrammatic only. The structure of the apparatus for carrying out the vacuum sensing of the seal areas 22 is shown in more detail in FIGS. 3 through 5A of the drawings.

Figure 3:
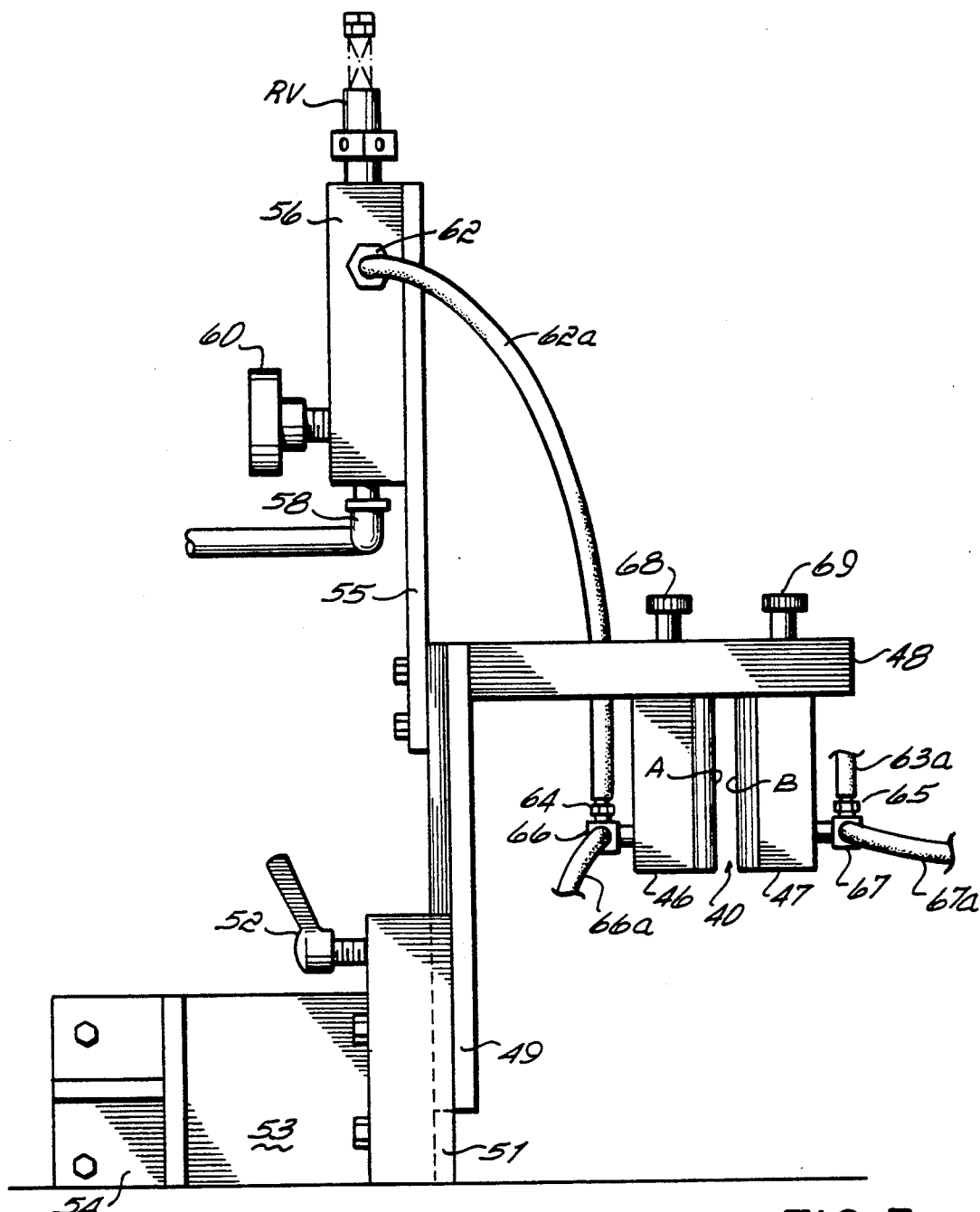
FIG. 3 is an end view of one embodiment of various structure and elements for vacuum sensing web seals.

Referring first to FIG. 3, a vacuum sensor 45 according to the invention is shown. The vacuum sensor comprises a pair of vacuum shoes 46 and 47, defining therebetween the gap 40. Shoes 46 and 47 are adjustably mounted in a bracket or mounting bar 48 carried on a slide 49. Slide 49 is mounted in a slide block 50, which includes an elongated dovetail recess 51 and an adjustment screw 52, which can be loosened to allow vertical motion of the slide 49 in block 50 and tightened to hold the slide 49 in a set vertical position. The slide block 50 is mounted to a mounting bar 53 and any other appropriate mounting member, such as an angle 54, for mounting the vacuum sensor on a pouch machine.

Two manifolds are mounted on mounting bar 55, which in the embodiment shown in FIG. 3, are located above the shoes 46 and 47. A first manifold block 56 is operatively connected with shoe 46 while a second manifold block 57 is operatively connected with vacuum shoe 47. Each manifold block 56 and 57 has a vacuum connector 58 and 59, each of which is connected to an independent and separate vacuum or suction source. Each manifold block 56 and 57 also incorporates a vacuum gauge 60, 61 respectively, and a respective vacuum fitting 62, 63, for connection via appropriate hoses 62a and 63a (not shown) to the respective vacuum fitting 64, 65 on vacuum shoes 46 and 47.

Returning to FIG. 3, it will be appreciated that the vacuum fittings 64, 65 also include other vacuum fittings 66 and 67, which are connected by hoses 66a and 67a to the vacuum sensor, such as sensor 35 (see FIG. 2). Hoses 62a and 66a correspond in part to line 31 of FIG. 2, while hoses 63a and 67a correspond in part to line 32 of FIG. 2.

It will be appreciated that the vacuum fittings 66 and 67 are operatively interconnected to a vacuum passageway 71, 72 respectively, within the respective shoes 46, 47, and are interconnected with the vacuum fittings 64 and 65 from the vacuum or suction sources through the respective manifolds 56, 57. The fittings 66 and 67 are also connected to the vacuum ports A and B, such as port A in vacuum shoe 46 and port in vacuum shoe 47.

Figure 4:
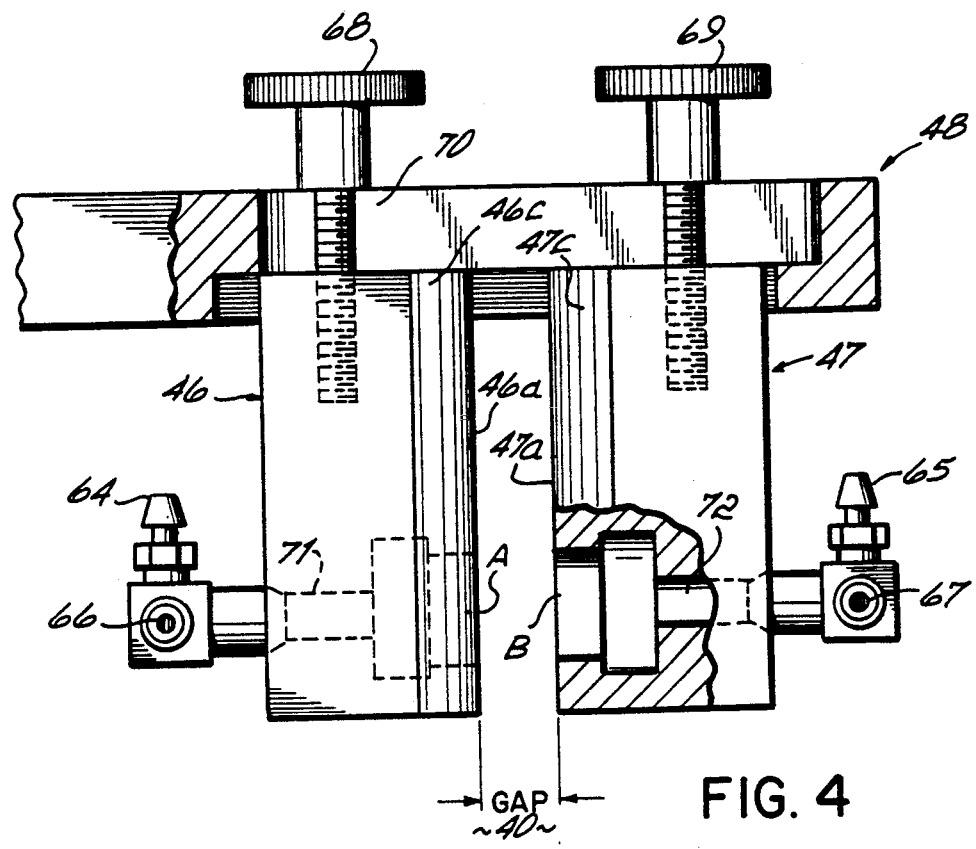
FIG. 4 is an enlarged view of the vacuum shoe portion of FIG. 3.

The ports A and B preferably comprise elongated slots shown in FIG. 4, which are aligned and disposed in register across the gap 40. Slotted ports A and B are elongated in the vertical direction and are disposed in respective parallel faces 46a, 57a of the shoes. Shoes 46 and 47 also include inclined faces 46b, 46c and 47b, 47c, defining converging and diverging entry and exit paths for web 25.

It will be appreciated that each of the vacuum shoes 46, 47 is provided with a respective adjustment knob 68, 69, whereby the shoes can be adjusted toward and away from each other to vary the gap 40. The knobs thus have a screw portion extending through an elongated slot 70 in the bar 48 for adjustment of the shoes to control the dimension of the gap 40.

Accordingly, while in FIG. 2, port A and port B are shown as simple round ports in a "T"-shaped fitting, the preferred embodiment of the invention is in detail more like that shown in FIGS. 3 through 5A as described above.

It will be appreciated that the elongation of the slotted ports A and B disposed in register with each other and across the gap 40, provide for the application of a rather large vacuum port against each respective sidewall of the folded pouch web running through the gap 40. This accommodates the utilization of sufficient vacuum pressures which, when the respective ports A and B are uncovered in the presence of the seal area in the gap 40, are sufficient to show a differential to drive the vacuum sensor 35. Thus, the piezo transducer 36 is operationally effective to indicate the resulting pressure differential in the respective independent vacuum or suction lines as a function of the passage of a seal area 22 to and through the gap 40.

Turning now briefly to FIG. 6, the general operation of the electric circuitry for handling the signal produced by the pressure differential in the presence of a moving seal area through the gap 40 is diagrammatically illustrated. The sensor 35, by means of the piezo electric transducer 36, comprises a bridge which has positive and negative inputs to an amplifier 80. The amplifier is utilized to buffer the load so that the bridge works in linear fashion. From there, the signal is directed through a level detection comparator 81, where thresholds are set to preselect the maximum and minimum signals sufficient to trip the circuitry to indicate seal passage. From there, the signal is transmitted to a level translation circuit 82 and from that circuit 82 to a programmable logic controller. Any suitable programmable logic controller can be utilized, such as that PLC manufactured by Giddings and Lewis of Fond du Lac, Wisconsin, and marketed under the model name PIC 900.

Figure 6A:
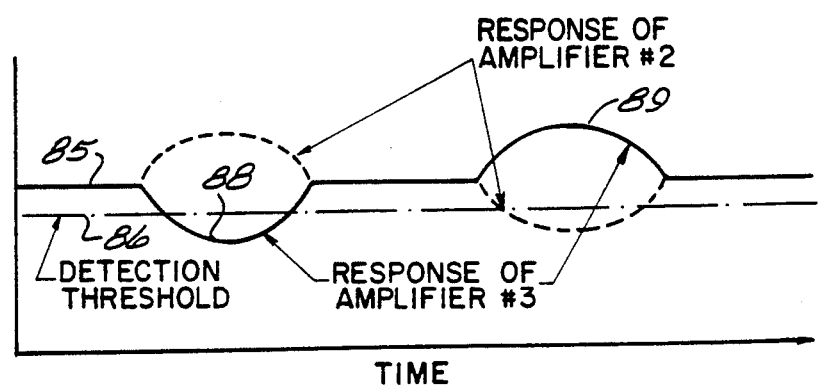
FIG. 6A is an illustrative view of the various seal sensing signals.

Referring now briefly to FIG. 6A, it will be appreciated that the piezorestrictive transducer and circuitry are preferably tuned to produce a balanced or static signal represented by the line 85 when vacuum is present in both ports A and B, as when the unsealed pouch walls block these ports. The areas above and below line 85 in FIG. 6A represent either positive or negative pressure differentials. The level detection comparator 81 is set to define a threshold. One such threshold is indicated by line 86. Any excursion of the signal 85 beyond threshold 86 will signal seal passage. When a pressure differential is sensed by the vacuum sensor 35, an electrical signal is generated, for example in the form of a wave or curve having a positive or a negative amplitude, such as at 88 or 89 (depending on which side of the sensor sees the changed pressure). Since the amplifiers 2 and 3 (FIG. 7) both pass a signal with opposite respective polarity at the same time, it does not matter whether the threshold 86 is set in the positive or negative side of static signal line 85. When the amplitude of this signal from either amplifier 2 or 3 crosses the preset threshold 86, the circuitry illustrated in FIG. 7 passes a signal to the programmable logic controller for indicating the passage of a seal area in gap 40.

Reviewing now FIG. 7, it will be appreciated that this figure shows further details of the circuitry illustrated in FIG. 6. Typical electrical values of components of FIG. 7 are shown as useful for systems operated at vacuum pressures of about 10" mercury (when the ports A and B are sealed). Other components or values may be used for systems requiring other vacuum or suction parameters as might be desired. In FIG. 7 there is an amplifier section 80, a level detection comparator 81 and a level translation element 82, such as illustrated in FIG. 6, but in more detail. The input to the amplifier section 80 is generated by a pressure differential sensed by the piezo electric sensor 35. Once the signals are processed, the signal indicative of the passage of a seal through the gap 40 is transmitted to the programmable logic controller PLC which, in turn, is interconnected to the cutter 26 and operates the cutter, after the appropriate delay and depending on this web speed, to cut the web 25 transversely through the seal area 22 and in the center of the seal area. It will be appreciated that the amplifier section 80 shown in FIG. 7 may be provided with an appropriate gain potentiometer as shown for balancing or equalizing the amplifiers 2 and 3.

It should be further appreciated that other control means may be provided to enhance the accuracy of the cutting operation. For example, it is desirable to adjust the seal sensing frequency with reference to a predetermined pouch pitch to reduce any "hunting" range of the system and error accumulation. An encoder may be associated with the master axis or motor which drives the gripper chain and apparatus of the filler wheel 28. That encoder produces a number of counts for each revolution of the master axis. The web 25 defines a plurality of pouches, each of which traverse a certain longitudinal distance or pouch pitch. This pitch can be adjusted for different pouches. For purposes of this description, pouch pitch will be considered to be that distance between the center of one seal area and the center of the immediately following seal area. Thus, a particular ratio can be determined between the number of counts of the encoder and the distance corresponding to a predetermined nominal pouch pitch. That particular ratio is set into the controller for comparison purposes. When the sensor 35 detects the passage of seal areas 22, that signal frequently is compared with a predetermined number of fixed encoder counts set into the controller and an error between the two signals is calculated. The controller is set up to collapse this error for the purpose of controlling a slaved web axis drive 90, such as a rubber roller pinch station (see FIG. 1, where only one roller is shown) to introduce pouches to the cutter according to the controller signal. The controller thus controls the web axis or drive as a function of the comparison between the seal sensing signal and the encoder signal from the filler wheel 28. The controller is set up so that any error correction is slewed or changed then at a relatively slow rate which will not buck the available slew rate of the slaved web axis drive. Thus, it will be appreciated that conceptually, the filler wheel 28 and the chain mechanism carrying the pouch grippers are driven by a master axis or servo, while the web feed axis or servo is considered to be a slave axis, controlled by the controller in response to the signal comparisons as noted above. Thus the sensed seal signal is transmitted to the PLC for comparing it to a known or predetermined pitch signal or frequency, so that the controller can then operate the knife or cutter 26 to cut the pouches in the seal area centered between the edges of the seal with continued correction of said magnitude, so that the tolerances between the cuts in the various seal areas are kept very small and uniform pouches are produced.

The operation of the circuitry in FIG. 7 will become readily apparent. Within that circuitry are located six amplifiers, 1 through 6, which may all exist on a common integrated circuit. Components 4 through 6 serve as comparators. Each of the active components of the circuitry in FIG. 7 are operated from +5 volts, the power inputs omitted from FIG. 7 for clarity. All components are decoupled with, for example, a one microfarad capacitor (not shown). Amplifiers 1 through 3 may also be part of a 2024 QUAD OP AMP. Amplifiers 4, 5 and 6 may be part of a 339 quad comparator.

It will be appreciated that a sensing of a pressure differential by the sensor 35 generates an electrical signal, either on the positive or negative side of the sensor. Amplifier no. 1 in amplifier section 80 is an inverting amplifier and, depending on the nature of the signal and on which side the seal 22 breaks to cover the respective ports A or B (see FIGS. 2A through 2C, for example), the detected signal is directed through amplifiers 3 and 4 or through 2 and 5. A balancing component is used, as shown to equalize amplifiers 2 and 3. In level detector comparator 81, the signal rising above the set threshold (by the threshold adjuster) is determined and is thus converted into a digital signal, the output of which is transmitted to the level translation element 82. On the way, the signal may also be used to trigger an LED 83 to serve as a visual indication of the passage of a seal through the gap 40.

In the level translation element or section 82, the signal is elevated from 5 volts to 24 volts, to the appropriate level for the specific PLC identified above.

Figure 8:
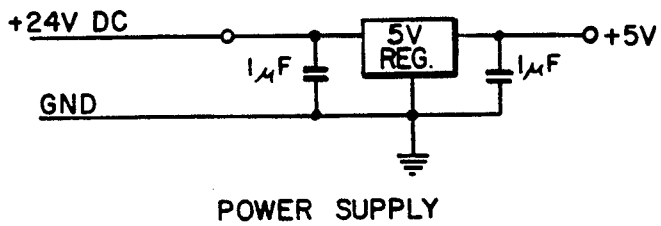
FIG. 8 is an electrical schematic illustrating a power supply for the circuit in FIG. 7.

As noted above, it will be appreciated that the components of FIG. 7 are primarily driven at 5 volts through a power supply located in the PLC and illustrated briefly in FIG. 8. The power supply steps the 24 volts DC current down to +5 volts for powering the components of FIG. 7.

Accordingly, and returning briefly to FIG. 6A, it will be appreciated that regardless of whether the signal excursion is a positive or negative (see excursions 88 and 89), once the signal from the amplifiers 2 or 3 extends beyond the preset threshold 86, it is amplified and translated to the PLC, as indicative of the passage of a sealed area 22 through the gap 40. For the particular PLC described above, it is only necessary that the threshold need only be lower than 5 volts to be considered low and higher than 15 volts to be considered high. The circuits shown in FIG. 7 will guarantee those parameters with a continuous signal through the circuitry, ranging from about 0.8 volts in the presence of no seal signal up to about 23 volts.

In an alternative embodiment, diagrammatically illustrated in FIG. 9, a single vacuum source 110 is utilized to draw suction at ports A' and B'. In other words, levers 31' and 32' are interconnected and are not isolated by means of separate sources or isolated check valves. As shown in FIG. 9, the conduits to ports A' and B' are common to the vacuum source 110 and the upstream portions of the lines 31' and 32' are also common to a vacuum pressure sensor 35', through the common line 111.

Since it is only necessary to detect a differential in the vacuum, it will be appreciated that the structure diagrammatically illustrated in FIG. 9 can be utilized with the same circuit as illustrated in FIGS. 6 and 7. In such a case, however, it is only necessary to connect the line 111 to one of the ports in the vacuum sensor 35. Vacuum sensor 35 is the same vacuum sensor as sensor 35 in the embodiment described above. With reference to FIG. 7A then, it will be appreciated that the utilization of a system utilizing only a single vacuum source can be used with such a sensor, but that line 111 is connected only to one of the chambers 38 or 39, with the other chamber being open. Thus one chamber will be vented to the atmosphere, for example, and one chamber will be interconnected to the vacuum system. When a seal area passes a gap 40, the vacuum will be released or reduced and the pressure in the lines will increase. This will be sensed by the vacuum chamber in the sensor, thereby creating an imbalance over the zero or null position. The piezorestrictive transducer 36 will be operable to convert this change in pressure into an electrical signal, which is then handled in the circuitry shown in FIGS. 6 and 7.

It will be appreciated there is increased sensitivity on the so-called vacuum or negative side of the bridge provided by the sensor 35. Thus for even more sensitive and accurate sensing, the line 111 would preferably be connected to the chamber corresponding to the sensing of the negative output of the transducer 36. Otherwise, the alternative embodiment shown in FIG. 9 will operate to sense the seal 22 areas moving past the gap 40' in much the same fashion as described above with respect to the embodiment utilizing two independent vacuum sources.

With respect now to the operation of the invention of either embodiment, it will be appreciated that on start-up, a train 25 of pouches, open at the top as shown in FIGS. 2 and 9, will be moved past the gap 40. When the ports A and B or A' and B' suck the sides of 23 and 24 of the pouch walls against the port, the circuits are adjusted to indicate a null position. Thereafter, when the pouch web is moved so that seal area 22 is positioned in the gap 40, one of the ports is uncovered and the piezo electric transducer 36 generates a signal indicative of that occurrence to indicate the passage of a seal area at the gap. When the pouch web 25 is brought up to speed, then the intermittent signals from the sensor 35 in the circuitry shown in FIG. 7 are conveyed to the PLC, for the purpose of controlling the system to ensure that the cutter generates a cut in the center of the seal area.

Thus, each seal area is sensed and that signal is amplified and processed for use by the PLC.

By way of further description, it will be appreciated that higher vacuum levels will generally produce better vacuum variations for sensing than will lower vacuum levels. A vacuum level, for example, of approximately ten inches of mercury on port blockage is adequate.

It will also be appreciated that the nozzle gap 40 is adjustable by moving the vacuum shoes 46, 47 toward or away from each other. It will be appreciated that too wide a gap will result in inaccurate sensing, possibly due to the requirement to overcome both the tension in the web due to pulling it apart, as well as to the additional air sucked into the system when seals are sensed. Such gap may vary, depending on the particular web materials utilized, however, gaps in the range of approximately 0.02 inches for typical folded pouch webs of two plies may be useful.

It will be further appreciated that a variation of no more than plus or minus 1/64 of an inch in the repeatability of the cut in the seal area 22 is desirable. The system described above is more than capable of producing tolerances within this range when considering a typical pouch forming operation. For example, the motor or servo driving the filler wheel, i.e. the chain track mounting the pouch grippers, may be any suitable high resolution motor, such as a motor or servo purchased from the Giddings and Lewis Company mentioned above. The motor is capable of producing a velocity with an error corresponding to pouch handling speed of less than the target tolerance. When using a web feed axis or servo web-drive including a drive roller 90 (at a web pinch station) having a diameter of about 2.5 inches, the range of linear web velocities in a pouch machine would then typically be about 40 inches per second to 10 inches per second. Pouches on 6 inch pitch (and having a seal about ⅜ inches wide) might typically be run at 320 pouches per minute. This would require a nominal speed of 32 inches per second. At this speed, there is 0.187 seconds between pouches (i.e. seal center to seal center). At these speeds, the variation in pouch position at any position on the machine is well within the target tolerance for the seal cut variation.

In another alternative embodiment, it will be appreciated that in certain applications, it may be possible to use a vacuum port or shoe on only one side of the web to serve the transverse seals. For example, a multiple ply, intermittently sealed web may be drawn around a roller with a tension sufficient to hold the roller-side ply and the seal against the roller, while the unsealed area of the other ply can be pulled across the gap between the roller and opposed vacuum port to block the port. Once the seal approached, however, the web tension would cause it to break from the port, resulting in a sensible pressure change at the port to indicate seal passage.

It will also be appreciated, referring to FIG. 6A, that the duration of the signal excursions from the static signal 85 may be measured and recognized in the PLC to indicate the width of the sensed seals, where that information is necessary.

It will be appreciated that the vacuum circuits can be modified as desired for particular or varied applications. For example, check valves on other regulators could be used to isolate vacuum circuits where a single source is used, but separate or isolated vacuum circuits are desired, and to control the gain in the vacuum circuit.

It will also be appreciated that the circuit of FIG. 7 is useful to analyze and transduce a useful signal responsive to a pressure change in said sensor regardless of which side of the sensor is connected to a positive pressure and which side is connected to a negative pressure.

Accordingly, it will be appreciated that the invention provides seal sensing and a moving web or train of pouches following one another seriatim, separated by transverse seals, such that the pouches can be cut, one from the other, by transverse cuts through the middle of the seal areas to produce consistently uniform pouches. The invention will accommodate a number of variations, such as a substitution of a single vacuum source, for example, modification of the gap, web speed, vacuum magnitude and the like, all to enhance the production of uniform pouches.

These and other alterations and modifications will become readily apparent to those of skill in the art without departing from the scope of the invention, and the applicants intend to be bound only by the claims appended hereto:

We claim:

1. Apparatus for sensing a transverse seal area between two adjacent plies of material separable beyond said seal where there is relative longitudinal motion between said apparatus and said material, said apparatus including:
   two opposed fluid ports having a gap therebetween;
   a respective fluid passageway connected to each port downstream thereof;
   means for applying a negative fluid pressure in said passageway to said ports;
   means for sensing changes in said fluid pressure in at least one of said passageways as a function of the respective covering of each port by a ply of material outside said seal area and the uncovering of one port by a transverse seal area moving longitudinally relative to said ports wherein said sensing indicates passage of a seal area through said gap.

2. Apparatus as in claim 1 wherein said means for applying a negative fluid pressure in one of said passageways is independent of means for applying a negative fluid pressure in another of said passageways.

3. Apparatus as in claim 2 wherein said passageways are independent and separated one from the other.

4. Apparatus as in claim 3 further including means for monitoring pressure in each of said separate passageways.

5. Apparatus as in claim 1 wherein said sensor comprises a piezorestrictive transducer and said respective passageways are operatively interconnected to opposite sides of said sensor.

6. Apparatus as in claim 1 including opposed vacuum shoes, each having a port face defining said gap and wherein each port is disposed in a vacuum shoe and comprises an elongated slot defined in a port face of said shoe.

7. Apparatus as in claim 6 wherein each said vacuum shoe has surfaces alongside each port face inclined away from said port face with respect to said gap.

8. Apparatus as in claim 6 wherein said vacuum shoes are adjustable toward and away from each other whereby said gap is adjustable.

9. Apparatus as in claim 6 wherein said vacuum shoes are vertically adjustable together and independently of said gap.

10. Apparatus for sensing intermittent seal areas in a moving train of pouches interconnected seriatim by said seal areas, said apparatus comprising:
    vacuum shoes defining a gap therebetween through which said train moves;
    a port in each shoe opposed to a port in an opposite shoe across said gap;
    respective vacuum passageway means for interconnecting each port to a vacuum source for pulling apart opposed walls of said pouches between said seal areas; and
    means for sensing a pressure differential in at least one of said passageways as a function of the arrival of a seal area in said gap between said ports.

11. Apparatus as in claim 10 including a separate vacuum source for each of said passageways.

12. Apparatus as in claim 11 wherein each of said passageways are independent and separated from the other passageway.

13. Apparatus as in claim 10 wherein said shoes are adjustably mounted for varying said gap.

14. Apparatus as in claim 10 wherein said shoes have faces defining a converging entrance to said gap and a diverging exit from said gap.

15. Apparatus as in claim 10 wherein said ports comprise elongated slots in each vacuum shoe, said slots being opposed and aligned in register with each other across said gap.

16. Apparatus as in claim 10 wherein said means for sensing comprises a piezorestrictive transducer.

17. Apparatus as in claim 16 wherein said respective passageways are operatively interconnected to separate sides of said transducer.

18. Apparatus as in claim 17 wherein said sensing means further includes means for amplifying signals from said tranducer which signals are indicative of sensed pressure changes, means for detecting and comparing the levels of signals from said amplifying means, and means for translating passed signals to a controller means for indicating the existence of a signal signifying the movement of a seal area in said train to and past said ports.

19. A method of sensing intermittent seal areas between plies in a moving web of at least two piles comprising the steps of:
    moving said web through a gap defined between opposed vacuum ports;
    applying a vacuum to each port through a passage connected thereto;
    sucking a respective ply of said web outside said seal area against each port;

when said seal area approaches and passes said gap, sucking said seal area against one of said ports, thereby uncovering another of said ports; and detecting a change in the pressure in at least one of said passages upon said uncovering, thereby indicating the presence of a seal area in said gap.

20. A method as in claim 19 wherein said vacuum applying step includes applying a vacuum to each port independently of the other port.

21. A method as in claim 20 wherein said detecting step includes detecting a pressure change in one of said passages independent of the other of said passages.

22. A method as in claim 19 including adjusting the gap between said ports to accommodate varying web materials and seal pitch.

23. A method of sensing intermittent seal areas in a train of pouches defined between transverse pouch wall seal areas and moving longitudinally including the steps of:

drawing unsealed pouch walls apart by applying fluid suction to each moving wall through opposed suction ports on opposite sides of said train forming a gap therebetween;

uncovering one of said ports as a seal area moves through said gap; and detecting a change in suction pressure downstream of said port as a function of the presence of a seal area in said gap.

24. A method as in claim 23 including the step of applying suction to each opposed port from independent suction sources.

25. A method of separating individual pouches from a train of pouches separated one from the other by transverse seal areas in a pouch web by cutting said pouches apart along said seal areas, said method including the steps of:

selecting a predetermined pouch pitch and rotating a pouch filler means, holding separated pouches, at a predetermined speed;

generating an encoder signal indicative of pouch speed in said filler means;

sensing transverse seal areas in said train and generating a seal signal in response to said sensing;

comparing encoder signals, pitch and sensing signals in a programmable logic controller; and at a cutting station, cutting pouches apart along said seals in predetermined areas thereof;

driving said train into said cutter station with a slaved train drive means; and controlling said train drive means as a function of a comparison between said encoder signals, pitch, and sensing signals.

26. A method as in claim 25 wherein said seal sensing step includes sensing said seals by drawing a vacuum against on both sides of unsealed areas of said train, at a station through which said train moves, breaking said vacuum on one side of said train at said seal areas when passing said station, and sensing pressure changes as a function of said vacuum breaking.

27. A method of generating a signal responsive to a pressure change occurring in a sensor having a piezoresistive transducer typically configured with a positive pressure side and a negative pressure side the method comprising;

indiscriminately generating respective positive and negative pressures on opposite sides of said transducer;

determining a static signal;

generating an excursion in said static signal in response to a charge in one of said pressures;

amplifying said signal;

comparing said excursion in said signal with a reference threshold; and translating any said signal having an excursion over said threshold to a controller means;

all regardless of which side of said transducer is exposed to said negative and positive pressure.

28. A method of sensing intermittent transverse seal areas in a multiple-ply web comprising the steps of:

moving said web past at least one vacuum port;

applying a negative pressure to said port to pull an unsealed side of said web over said port and blocking said port with said unsealed side of said web;

advancing a sealed area toward said port;

pulling seal areas away from said port such that said port is opened; and sensing a pressure change responsive to said port opening indicative of a seal area passing said port.

* * * * *